(12) United States Patent
Tan (10) Patent No.: US 7,081,008 B2
(45) Date of Patent: Jul. 25, 2006

(54) APPARATUS FOR PRODUCING AN OUTPUT VOLTAGE TO POWER AN ELECTRONIC DEVICE

(76) Inventor: William Tan, 676 South Avenue 21, Studio 400, Los Angeles, CA (US) 90031

( * ) Notice: Subject to any disclaimer, the term of this patent is extended or adjusted under 35 U.S.C. 154(b) by 0 days.

(21) Appl. No.: 10/530,943

(22) PCT Filed: Oct. 30, 2002

(86) PCT No.: PCT/SG02/00256

§ 371 (c)(1),
(2), (4) Date: Apr. 8, 2005

(87) PCT Pub. No.: WO2004/045056

PCT Pub. Date: May 27, 2004

(65) Prior Publication Data

US 2006/0049816 A1   Mar. 9, 2006

(51) Int. Cl.
*H01R 11/00* (2006.01)

(52) U.S. Cl. .................................................. 439/502
(58) Field of Classification Search ................ 439/502, 439/503, 490, 498, 63, 638, 304; 362/236, 362/249
See application file for complete search history.

(56) References Cited

U.S. PATENT DOCUMENTS 6,672,896 B1 *   1/2004   Li ............................. 439/502
6,760,232 B1 *   7/2004   Smith et al. ................ 361/780
6,848,926 B1 *   2/2005   Ling et al. .................. 439/304
6,923,683 B1 *   8/2005   Dulai et al. ................ 439/638
6,969,273 B1 *  11/2005   Chen .......................... 439/490
2001/0001765 A1  5/2001   Chen .......................... 455/569

FOREIGN PATENT DOCUMENTS

DE   19715596 A1   10/1998
JP   07 106032 A    4/1995

* cited by examiner

Primary Examiner—J. F. Duverne
(74) Attorney, Agent, or Firm—East IP Group; Philip K. Yu (57) ABSTRACT

Apparatus for producing an output voltage $V_o$ to power an electronic device is disclosed herein. According to the preferred embodiment, the apparatus comprises a power supply (100) having two or more first connection elements (108) in which some or all of the first connection elements (108) are in series with different respective resistive loads (103) and circuitry for maintaining the first connection elements (108) at different voltages, and a connector assembly (200) arranged to be coupled between the power supply (100) and the electronic device. The connector assembly (200) includes at least two second connection elements (204) for connection to respective ones of the first connection elements (108) and electrically connectable to the electronic device and also includes selection means, in the form of an electrical wire (203), for modifying the voltage difference between the first connection elements (108) to which the second connection elements (204) are connected, whereby the connector assembly (200) draws a selected voltage from the power supply (100) and passes the selected voltage $V_o$ to the electronic device.

27 Claims, 9 Drawing Sheets

| VOLTAGE | CALCULATION | R5 | R4 | R3 |
|---|---|---|---|---|
| 3 | 15-9-3+0 | +5V | +5V | - |
| 4 | 15-9-3+1 | +5V | +5V | 0V |
| 5 | 15-9+0-1 | +5V | - | +5V |
| 6 | 15-9+0+0 | +5V | - | - |
| 7 | 15-9+0+1 | +5V | - | 0V |
| 8 | 15-9+3-1 | +5V | 0V | +5V |
| 9 | 15-9+3+0 | +5V | 0V | - |
| 10 | 15-9+3+1 | +5V | 0V | 0V |
| 11 | 15+0-3-1 | - | +5V | +5V |
| 12 | 15+0-3+0 | - | +5V | - |
| 13 | 15+0-3+1 | - | +5V | 0V |
| 14 | 15+0+0-1 | - | - | +5V |
| 15 | 15+0+0+0 | - | - | - |
| 16 | 15+0+0+1 | - | - | 0V |
| 17 | 15+0+3-1 | - | 0V | +5V |
| 18 | 15+0+3+0 | - | 0V | - |
| 19 | 15+0+3+1 | - | 0V | 0V |
| 20 | 15+9-3-1 | 0V | +5V | +5V |
| 21 | 15+9-3+0 | 0V | +5V | - |
| 22 | 15+9-3+1 | 0V | +5V | 0V |
| 23 | 15+9+0-1 | 0V | - | +5V |
| 24 | 15+9+0+0 | 0V | - | - |

- DENOTES NO CONNECTION

NC- DENOTES NO CONNECTION

NC- DENOTES NO CONNECTION

NC- DENOTES NO CONNECTION

NC- DENOTES NO CONNECTION

NC- DENOTES NO CONNECTION

APPARATUS FOR PRODUCING AN OUTPUT VOLTAGE TO POWER AN ELECTRONIC DEVICE

This application is the national phase under 35 U.S.C. § 371 of PCT International Application No. PCT/SG02/000256 which has an International filing date of Oct. 30, 2002, which designated the United States of America.

BACKGROUND AND FIELD OF THE INVENTION

This invention relates to apparatus for producing an output voltage suitable to power an electronic device.

Electronic devices such as laptop computers, cellular phones, digital camcorders and portable music players are typically powered from an external power source such as line current or the electrical systems of automobiles. Alternatively, the electronic devices may be powered from an internal rechargeable battery.

To power an electronic device externally or to recharge an internal battery of the electronic device, the manufacturer provides an external power supply which may be a switching power supply commonly known as an AC adapter that may weigh close to a pound and may be about six inches long, three inches wide and about two inches high.

The external power supply therefore contribute substantially to the weight of the electronic device since a user would need to carry the external power supply with him to permit the charging of the internal battery and/or powering the device from an electrical wall socket. Furthermore, with a wide range of portable electronic devices available in the market with different power requirements, it may be necessary for a user of these different electronic devices to carry more than one AC adapter.

Some manufacturers propose to resolve the problem by introducing a universal power supply which enables selection of a specific voltage, for example within the range of 3V—24V. This alleviates the need to carry several power adapters to power different electronic devices. The selection of the voltage is normally done via a multi-position switch that in turn controls a voltage converter in the universal power supply to generate an output voltage in accordance with the switch setting. This accommodates the different voltage/power requirements for different devices.

However, there is another incompatibility problem which is faced by the user of such electronic devices. Different electronic devices may use different input sockets with different dimensions and thus such an universal power supply may further comprise a number of different interface connectors to match the power supply's output plug to the input sockets of these electronic devices. These different interface connectors come in different shapes and sizes and are offered by many manufacturers, such as the range of "Adaptaplugs" offered by Radioshack Corporation of Fort Worth, Tex., USA.

To use such a universal power supply, the user selects the required voltage rating and attaches an appropriate interface connector to the output plug of the power supply and then connects the power supply to the electronic device via the interface connector. Thus, the proper use of the universal power supply depends on user's proper selection of the correct voltage requirement in addition to choosing the correct interface connector. The possibility of the user incorrectly or accidentally selecting a voltage unsuitable for a corresponding electronic device's voltage requirement is real and this often results in damage to the device's internal electrical circuitry. There is also a possibility of the user mis-matching the polarity of the interface connector which may also result in electrical damage to the electronic device.

To reduce the chances of damaging the electronic device, some manufacturers incorporate resistor circuitry in the interface connector, for example the range of connectors called "PowerTips" from Targus Inc. of Anaheim, Calif., USA, in which the patentee of the present application understands to be licensed from Comarco Wireless Technologies (patent no. U.S. Pat. No. 6,091,611). The resistor circuitry built into the connector replaces the manual selection of the desired voltage since the resistor circuitry controls the voltage/current supplied to the electronic device. As such, a plurality of interface connectors unique in their physical dimension and resistor circuitry to provide a predetermined voltage is available which corresponds to the different input socket dimensions and voltage requirements of different electronic devices. This obviates the need for a power converter and a multi-position switch within the universal power supply.

Although such a voltage selection means greatly reduces the possibility of the user selecting an incorrect voltage, it necessitates the manufacturer producing a vast number of interface connectors to accommodate different types of electronic devices. Suppose, for example, that ten different types of interface connectors are required to fit the input sockets of fifty different laptop computers. Suppose further that the input voltages required by these fifty laptop computers are different, say 12V, 15V and 18V. This means that the manufacture needs to have a corresponding number of resistive circuits in the connector to regulate the output voltages. Consequently, the permutations of connectors required to support each of these fifty laptop computers would be thirty. This possibly raises production costs which may ultimately be borne by the end user of such power supplies.

It is an object of the present invention to provide an apparatus for producing an output voltage which alleviates the disadvantage of the prior art and/or to provide the public with a useful choice.

SUMMARY OF THE INVENTION

The invention, in general terms, relates to a power supply arranged to output different voltages and a connector assembly having selection means arranged to select a suitable output voltage to power an electronic device.

In a first aspect of the invention, there is provided apparatus for producing an output voltage to power an electronic device, the apparatus comprising a power supply comprising two or more first connection elements in which some or all of the first connection elements are in series with different respective resistive loads and circuitry for maintaining the first connection elements at different voltages, and a connector assembly arranged to be coupled between the power supply and the electronic device; the connector assembly having at least two second connection elements for connection to respective ones of the first connection elements and electrically connectable to the electronic device, the connector assembly further having selection means for modifying the voltage difference between the first connection elements to which the second connection elements are connected, whereby the connector assembly draws a selected voltage from the power supply and passes the selected voltage to the electronic device.

An advantage of the described embodiment of the invention is that the user of the apparatus needs only to select the corresponding connector assembly for a particular model of electronic device for connection between the power supply and the electronic device. This reduces the possibility of the user selecting a wrong voltage. In this way, the apparatus is programmed to output a voltage in accordance with the selection means of the connector assembly.

According to a second aspect of the invention, there is provided a power supply comprising two or more first connection elements and circuitry for maintaining the first connection elements at different voltages, the power supply being arranged to be coupled to a connector assembly having at least two second connection elements for connection to respective ones of the first connection elements of the power supply and electrically connectable to an electronic device, the connector assembly further having selection means for modifying the voltage difference between the first connection elements to which the second connection elements are connected, whereby the connector assembly draws a selected voltage from the power supply and passes the selected voltage to the electronic device.

According to a third aspect of the invention, there is provided a connector assembly arranged to be coupled between a power supply and an electronic device, the power supply comprising two or more first connection elements and circuitry for maintaining the first connection elements at different voltages, the connector assembly comprising at least two second connection elements for connection to respective ones of the first connection elements of the power supply and electrically connectable to the electronic device, and selection means for modifying the voltage difference between the first connection elements of the power supply to which the second connection elements are connected, whereby the connector assembly draws a selected voltage from the power supply and passes the selected voltage to the electronic device.

Preferably, the power supply comprises more than two first connection elements and the selection means includes one or more auxiliary connection elements which are connectable to selected ones of the first connection elements to vary the voltage difference between the first connection elements to which the second connection elements are attached. Typically, the auxiliary elements are electrically connected to each other.

The sides of the resistive loads away from the first connection elements may be mutually connected to a point in a voltage divider circuit such that upon connection of the auxiliary connection elements to selected ones of the first connection elements, the voltage at the point in the voltage divider is held substantially constant and the voltage difference is varied between the first connection elements to which the second connection elements are attached.

Preferably, the second connection elements of the connector assembly are electrically connectable to the electronic device via an electric cable.

BRIEF DESCRIPTION OF THE DRAWINGS

An embodiment of the invention will now be described, by way of example, with reference to the accompanying drawings in which.

DETAILED DESCRIPTION OF THE PREFERRED EMBODIMENT

Figure 1:
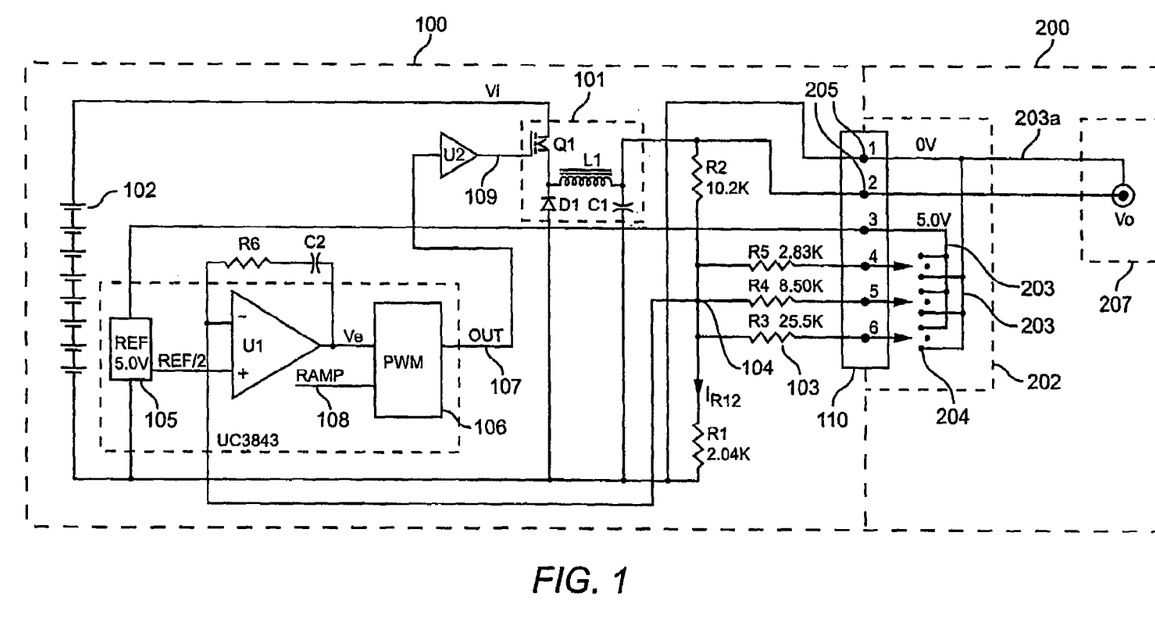
FIG. 1 is a schematic diagram of a power supply arranged to output an output voltage and a connector assembly for selecting the output voltage according to the preferred embodiment of the invention.

FIG. 1 is a circuit diagram illustrating apparatus arranged to generate an output voltage $V_o$ suitable for powering an electronic device according to the preferred embodiment of the invention and which comprises a power supply 100 and a connector assembly 200 for automatically selecting the output voltage $V_o$.

The power supply 100 comprises a voltage converter 101 in the form of a conventional buck converter 101 which will be familiar to a person skilled in the art. The voltage converter 101 converts power from an internal eight cells battery 102 to an output voltage $V_o$, which is less than the cumulative voltage of the battery 102. Typically, the output voltage is in the range of 3V to 24V DC.

This arrangement is similar to the power supply 100 proposed in a patent application PCT/SG02/00031 by the applicant of the present invention except that the power supply 100 further comprises a resistive network 103 which forms a divider circuit and a regulation circuit formed by a comparator and a pulse width modulator (PWM) 106.

The power supply 100 regulates the output voltage $V_o$ by dividing down the output voltage $V_o$ using the resistive divider 103 which comprises a plurality of resistive elements for providing a plurality of electrical loads to vary the output voltage $V_o$. In a basic form, the resistive divider 103 comprises resistors R1 and R2 connected as shown in FIG. 1. Node 104 of the resistive divider 103 is coupled to a negative (−ve) input of the comparator which, in this embodiment, is in the form of an error amplifier U1. A positive (+ve) terminal of the error amplifier U1 is tied to a stable voltage reference 105 which in this embodiment is 2.5V (half of 5.0V reference). The voltage at node 104 of the resistive divider 103 is thus compared with the voltage reference 105 and if the voltage converter 101 is outputting the output voltage $V_o$ correctly, the −ve and +ve inputs of the error amplifier U1 would be substantially at a same voltage, typically within a few mVolts. The error amplifier U1 is stabilised by a feedback network which comprises R6 and C2.

Figure 1A:
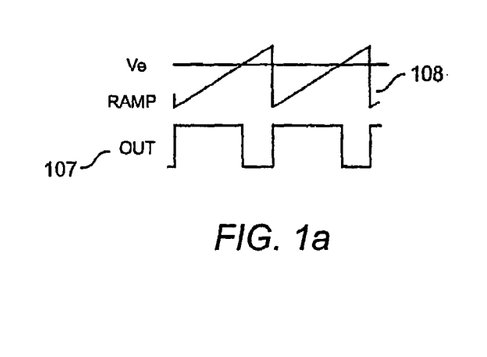

The error amplifier U1 produces an analog output voltage $V_e$ or error signal which is converted to a digital signal by the PWM 106 as shown in FIG. 1a. The PWM 106 compares the output of the error amplifier $V_e$ to a sawtooth ramp signal 108 which is typically 1V in amplitude at 100 Hz frequency. The output 107 of the PWM 106 is "high" whenever the ramp input amplitude 108 is lower than that of the error signal $V_e$ and is "low" whenever the ramp input amplitude 108 is higher than $V_e$, thus creating a pulsed waveform as shown in FIG. 1a. In this way, the error signal Ve is converted to a digital signal (PWM's output 107) of fixed frequency with a duty ratio D which can vary linearly between 0 and 100%.

The PWM's output 107 is applied to an input of a driver U2 having an output 109 connected to a "Gate" terminal of a power MOSFET Q1. The driver U2 provides level translation and drives the MOSFET Q1 to turn the MOSFET ON or OFF depending on the state of the PWM output 107. In this embodiment, MOSFET Q1 is turned ON whenever the PWM output 107 is a "high" and is OFF if the PWM output 107 is a "low".

The MOSFET Q1, diode D1, Inductor L1 and capacitor C1 form the buck converter 101 as described earlier, which receives an input from the battery, and outputs a corresponding voltage at the output of the power supply 100 (which is $V_o$).

It would be apparent to a skilled man in the relevant art that the input voltage of the buck converter 101 $V_i$, output voltage $V_o$ and the switching duty ratio D of the buck converter 101 are related by the equation $V_o = V_i * D$. Therefore, by varying the duty ratio D between 0 to 100%, the output voltage $V_o$ can be varied from zero to the maximum voltage of the batteries 102. If the output voltage $V_o$ increases for any reason, for example due to reduction in the current drawn by the load, the error signal $V_e$ decreases. This causes the duty ratio D to reduce since the OFF state of the PWM output will increase. With the duty ratio D reduced, $V_o$ would be adjusted accordingly since, as mentioned, $V_o = V_i * D$ until an equilibrium condition is reached. In this way, the output voltage is regulated to a present voltage appropriate to the requirement of the electronic device to which the power supply 100 is connected.

The circuitry encompassing the PWM, error amplifier U1 and the stable voltage reference 105 can be provided in an integrated circuit such as UC3843 available from Texas Instrument.

Respective outputs of the buck converter 101 are also coupled to two first connection elements 205 of an input connector 110 for coupling to the connector assembly 200. These two first connection elements 205 are used to carry an electrical current to the connector assembly 200 and subsequently used to power an electronic device.

The gain of the error amplifier U1 is very high, preferably 10,000, and thus the two inputs of the error amplifier are maintained in an equilibrium condition.

Therefore the −ve input is held substantially to be at 2.5V as is the +ve input. To maintain a balance voltage between the two inputs (+ve and −ve) of the error amplifier U1, a current, $I_{R12}$, of 2.5V/2.04 k through R1 is necessary to maintain 2.5 volts at the negative (−ve) input of the error amplifier U1. This current $I_{R12}$ develops a voltage of 12.5 volts (i.e. $I_{R12}*R2$) across R2. The output voltage $V_o$ would thus be 2.5V+12.5V=15.0V, approximately.

The arrangement allows the power supply 100 to output a fixed output voltage in accordance with the values of R1, R2 and the voltage reference 105. To adjust or manipulate the output voltage $V_o$ to output a plurality of voltages, the resistive divider 103 further comprises a plurality of resistors, R3 to R5, with one terminal of the resistors R3 to R5 coupled to the node 104 and the other terminal of the resistors R3 to R5 coupled to three first connection elements of the input connector 110, as shown in FIG. 1. The input connector 110 is arranged to be connected to a corresponding interface connector 201 of the connector assembly 200.

Figure 2:
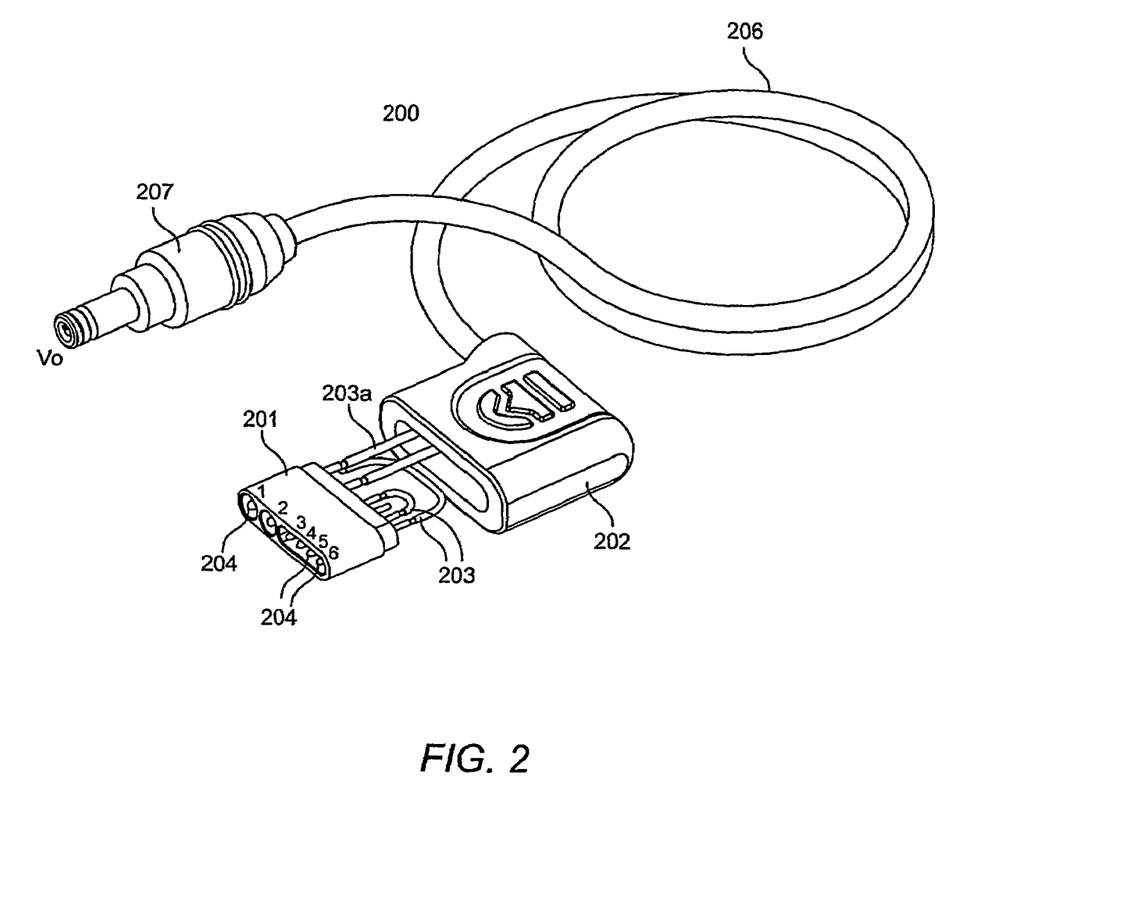
FIG. 2 illustrates a perspective exploded view of the connector assembly of FIG. 1.

FIG. 2 shows a perspective view of the connector assembly 200 with an interface connector 201 disassembled from a connector housing 202. The connector housing 202 may be molded around the connector 201 during production. The connector assembly 202 comprises selection means to select at least one of the resistors R3 to R5 and in this embodiment, the selection means is in the form of an electrical wire 203 and FIG. 2 shows two wires 203 being used. The connector assembly 200 also comprises second connection elements 204 for connection to respective ones of the first connection elements 205 of the power supply 100 and in this embodiment, the second connection elements 204 are in the form of pins 1 to 6. The electrical wires 203 connects any one of pins 4 to 6 of the connector assembly 200 to pin 1 or pin 3 which corresponds to 0V and 5V respectively at the power supply end. The number of pins 1 to 6 would typically correspond to the number of first connection elements 205 in the input connector 110 of the power supply 100 and in this case there are six pins to six connection elements 205. The pins 1 to 6 are inserted into the interface connector 201 which is then coupled to the connector 110 of the power supply 100 such that each pin 1 to 6 is electrically connected to the corresponding first connection elements 205 of the input connector 110.

Two of the pins, 1 and 2, and the corresponding wires 203a are connected to the buck converter 101 via two first connection elements 205 to carry the output current, typically 3 amps, from the power supply 100. Since the node 104 is maintained at +2.5V by the error amplifier U1, connecting any one of resistors R3, R4 or R5 to 0V or 5V will increase or decrease the output voltage $V_o$ by a predetermined amount. Each resistor R3 to R5 is thus selected so that when any of these resistors are connected as described above, R1 draws current from the voltage converter to develop a corresponding voltage drop across R2.

For example, the value of R3 is chosen to be 25.5K so that the current through it, 2.5/25.5K, develops an extra 1 volt across resistor R2, raising the output voltage to 4 volts if pin 6 is connected to pin 1 which is 0V. Conversely, if pin 6 is connected to pin 3 which is at 5V, the same current 2.5/25.5K flows into node 104 so that the current is subtracted from the current through R2 to maintain equilibrium, causing $V_0$ to fall by 1 volt.

Figure 3:
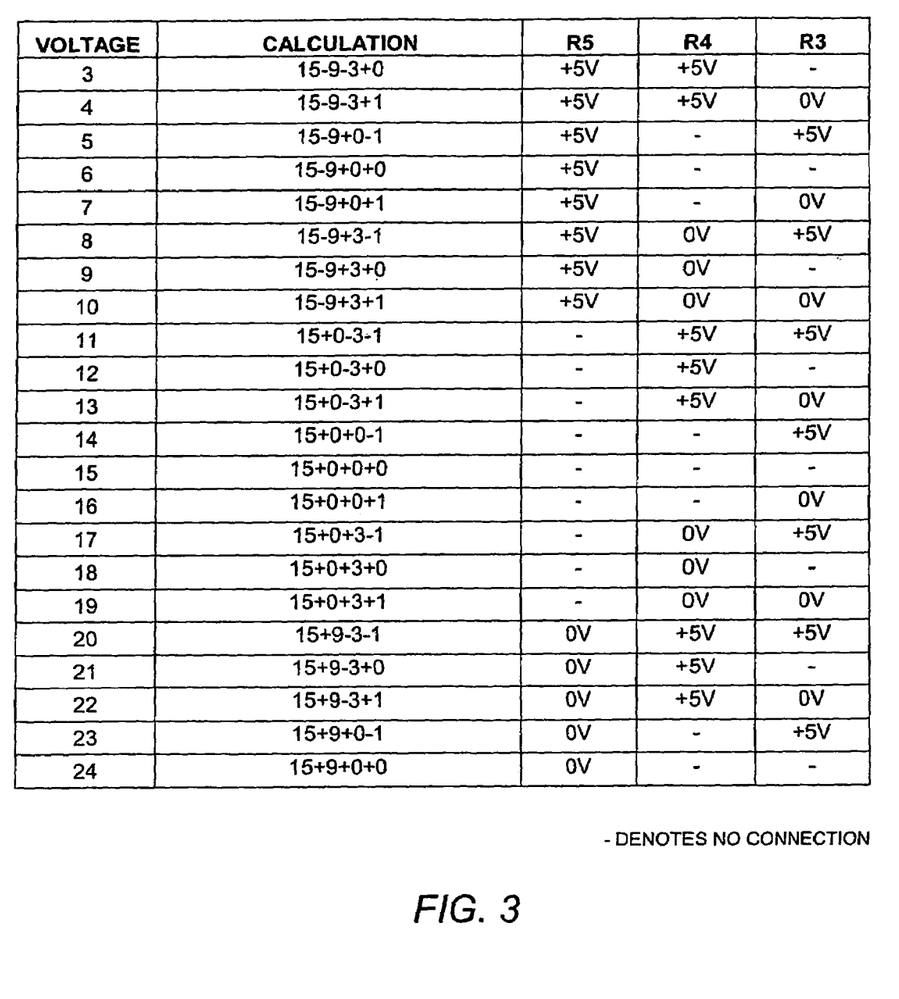
FIG. 3 is a table showing various output voltages which can be selected by the connector assembly of FIG. 2.
Figure 4:
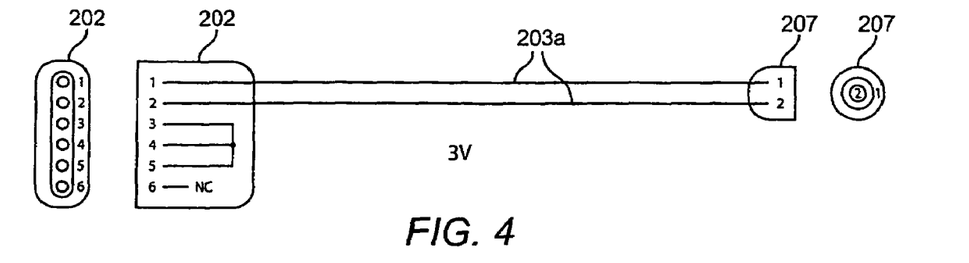
FIGS. 4 to 25 illustrate schematic diagrams of the connector assembly of FIG. 2 depicting different wiring in the connector assembly for selecting the output voltage of the power supply.
Figure 5:
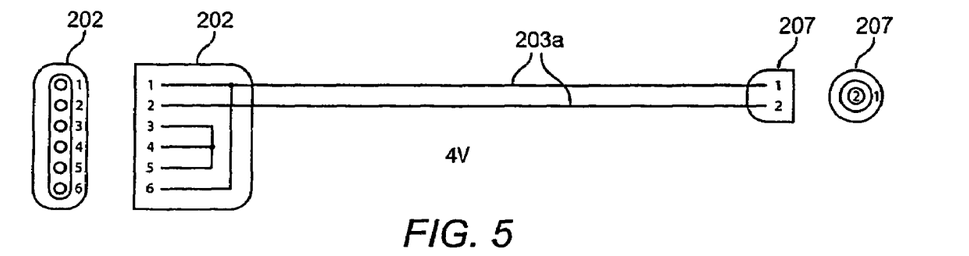
Figure 6:
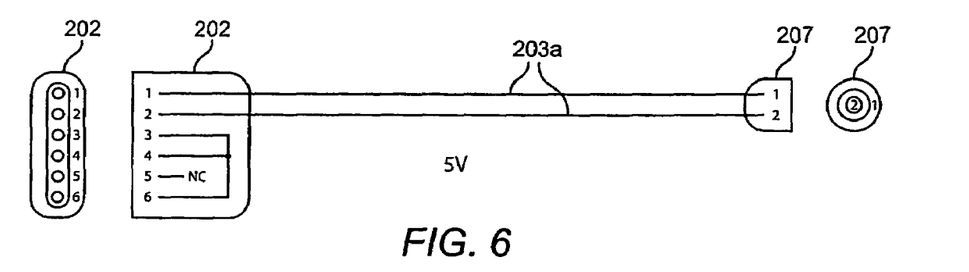
Figure 7:
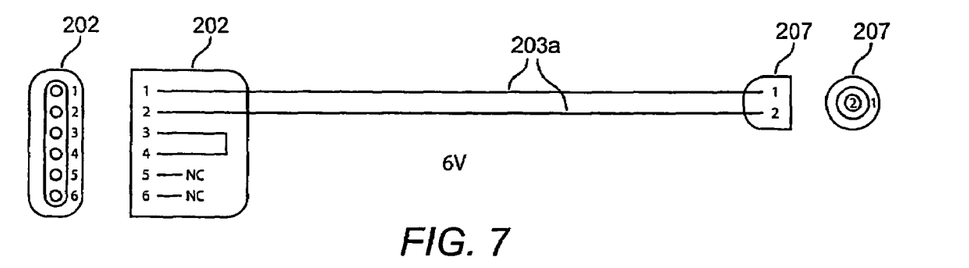
Figure 8:
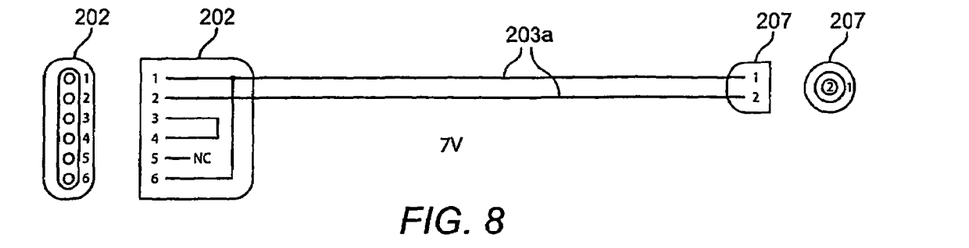
Figure 9:
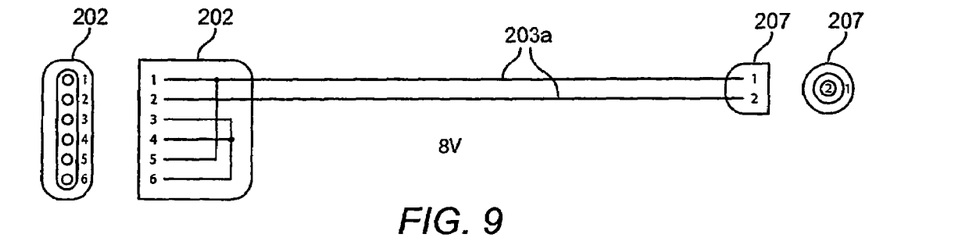
Figure 10:
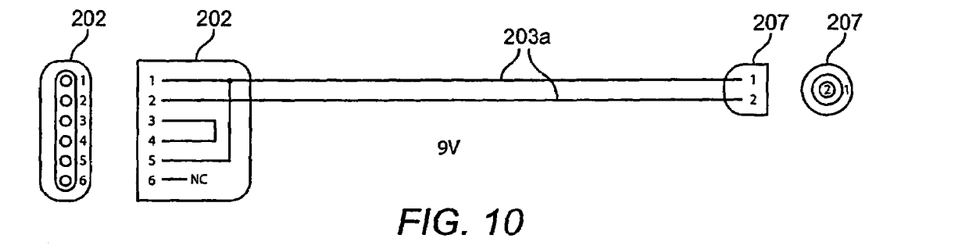

Because the resistors R3, R4 and R5 can each be connected in one of three states, that is, to +5 volts, to 0 volts, or unconnected, the resistor values are weighted according to a ternary scale $3^0$, $3^1$, $3^2$. Accordingly, resistors R4 and R5 are selected to be 8.50K and 2.83K respectively so that their effect on the output voltage is 3V and 9V respectively. FIG. 3 shows a table depicting how the connections of the resistors R3 to R5 affect the output voltage $V_o$ of the power supply 100.

Figure 11:
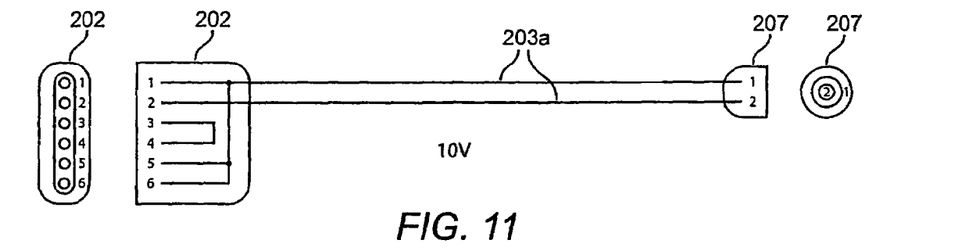
Figure 12:
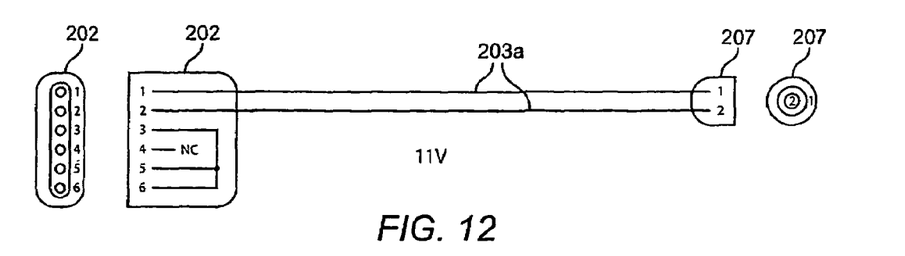
Figure 13:
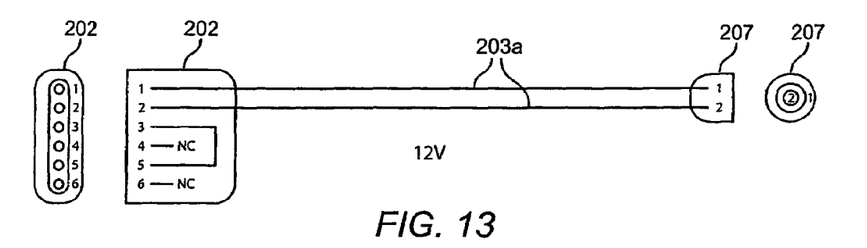
Figure 14:
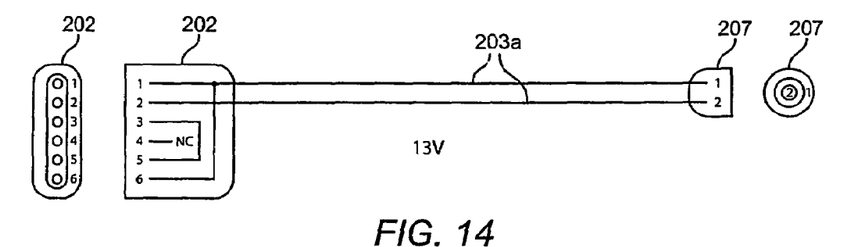
Figure 15:
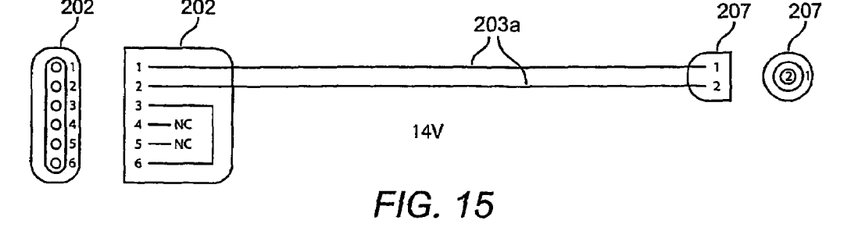
Figure 16:
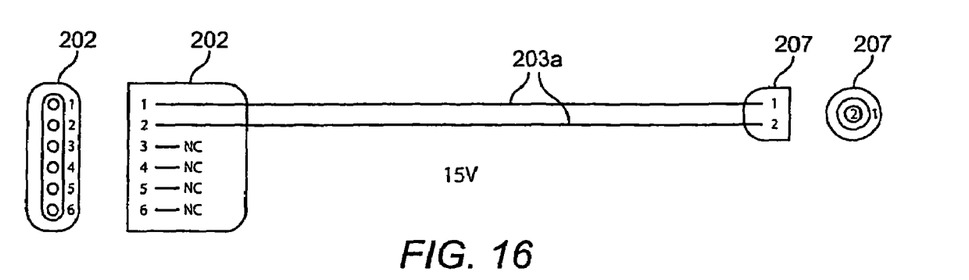
Figure 17:
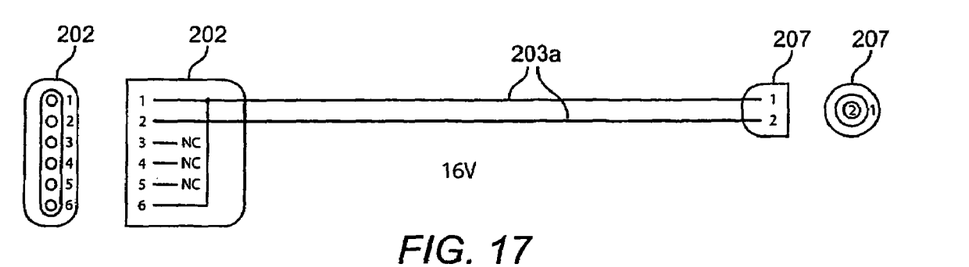
Figure 18:
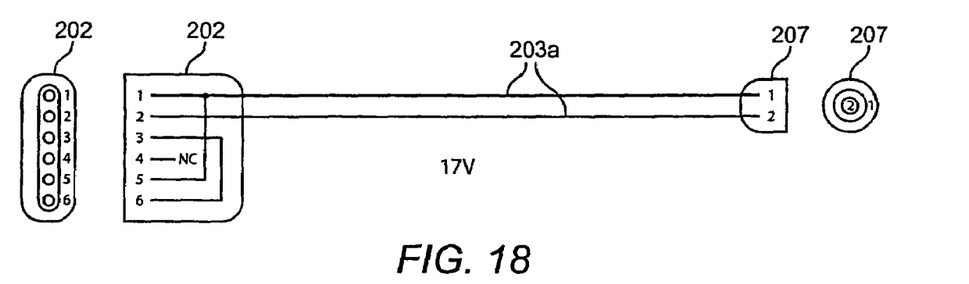
Figure 19:
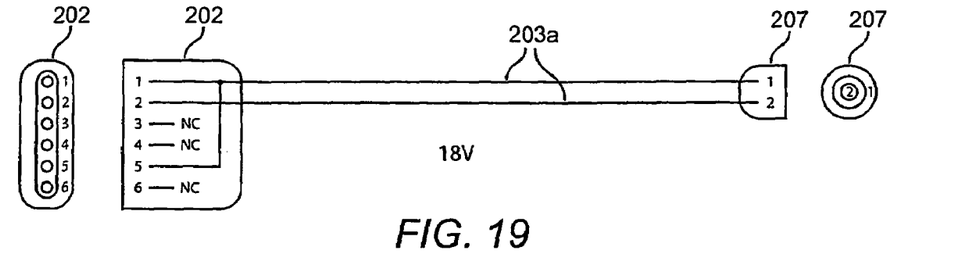
Figure 20:
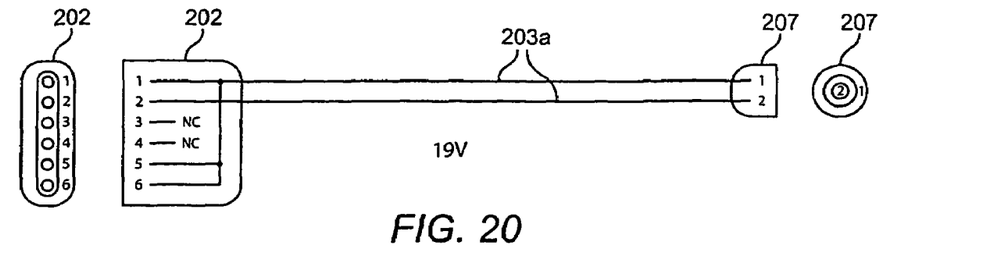
Figure 21:
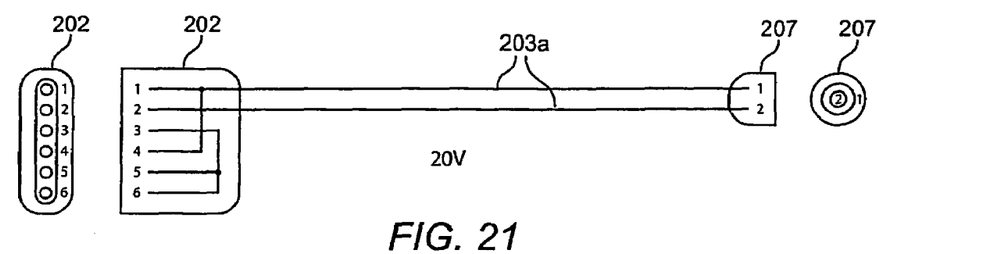
Figure 22:
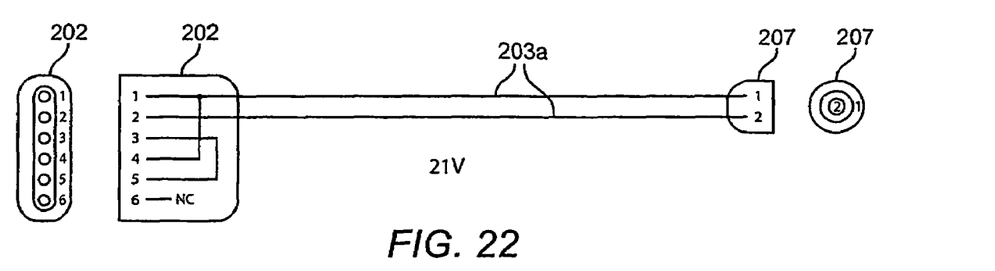
Figure 23:
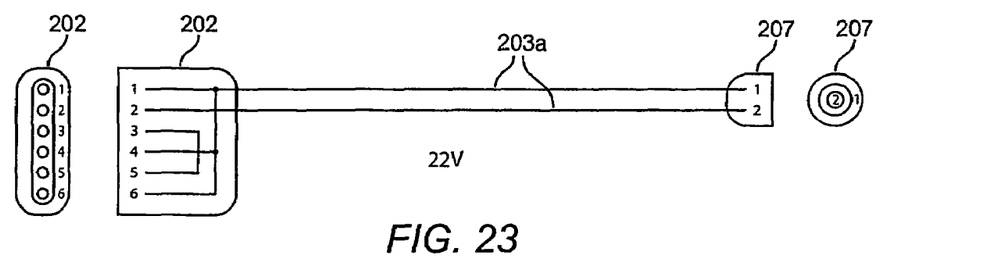
Figure 24:
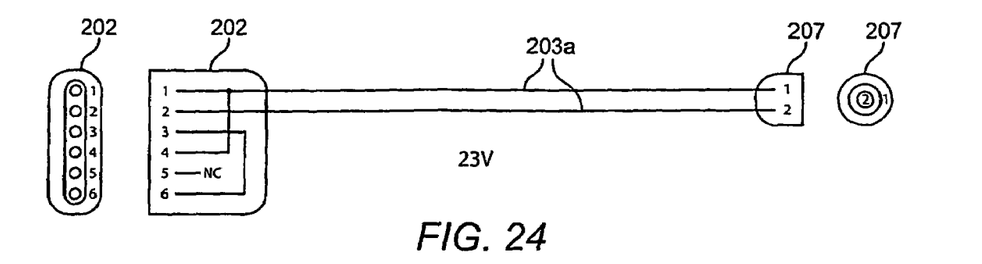
Figure 25:
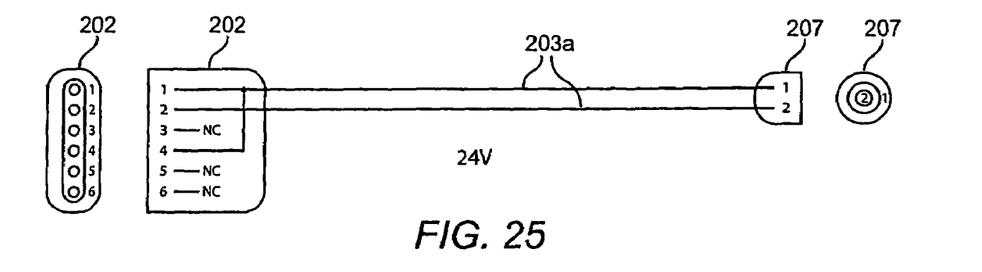

Therefore, different connector assemblies 200 are configured by connecting the electrical wire or wires 203 between pins 4 to 6 and pins 1 and 3 depending on what is the required voltage output $V_o$. FIGS. 4 to 25 shows how the pins 1 to 6 are connected schematically to "switch" between the different voltages available for selection as shown in the table in FIG. 3. For example if a user requires the power supply 100 to output 10V, then he would need to select the connector assembly 200 which has the configuration of FIG. 11. This means that pins 5 and 6 are connected to pin 1, and pin 4 is connected to pin 3. When the connector assembly 200 is coupled to the connection elements 205 of the power supply 100, this translates to resistors R3 and R4 being connected to 0V whereas R5 is connected to 5V. On the other hand, if a user requires 15V then he would need to select the connector assembly 200 of FIG. 16 with none of the pins connected.

The connection between the pins 1 to 6 is carried out during the manufacturing process and is thus transparent to the user. The user would also be provided with a chart which has the model numbers of each available connector assembly 200 since it would not be feasible for the user to inspect the connection to know whether that is the connector assembly 200 he requires.

The connector assembly 200 also comprises an electric cable or cord 206 (see FIG. 2) arranged to carry the current wires 203a and terminated with an output connector 207 that mates with an input socket of the electronic device being powered by the power supply 100. Various off-the-shelf application specific connectors 207 may be used so that the connector assembly 200 is able to mate with any particular electronic device. In this way, the design of the connector assembly 200 is simplified.

In use, the chart that is available to a purchaser of the power supply 100 will depict the different types of electronic devices and their corresponding model or type of connector assembly 200 to use. The wire or wires 203 are already pre-connected according to model to output voltages associated with respective electronic devices and are thus transparent to the user.

The interface connector 201 of the connector assembly 200 is then connected to the power supply 100 whereas the output connector 207 of the connector assembly 200 is connected to the input socket of the electronic device. When power is applied to the power supply 100, the voltage is automatically regulated by the resistive network 103 as described earlier, and depending on the configuration of the pins 1 to 6, a corresponding voltage $V_o$ will be output by the power supply 100.

Using the connector assembly 200 obviates the need of the user to manually select the required voltage output $V_o$ and thus reduces the possibility of selecting an incorrect output voltage. The connector assembly allows an easy method of switching between different output voltages $V_o$ so that the correct voltage is used to power an electronic device. If the output connector 207 of the connector assembly 200 is adapted to fit into the input socket of the electronic device, this also obviates chances of using interface sockets with the wrong polarity.

On the other hand, the output connector 207 of the connector assembly 200 may be generic and readily available from connector manufacturers such that it may be used to interface the connector assembly 200 and the input socket of the electronic device. This will also reduce the number of connector assemblies 200 required to support the different electronic devices available since the permutations is reduced and the production cost would also be lowered as the interface sockets can be separately bought depending on the requirements of the user.

Such a method can be applied to any power supply circuitry in order to enhance the universal feature in a power supply to various electronic devices. Such power supplies include, but are not limited to, switching power supply (AC adapters) and portable battery packs.

The described embodiment should not be construed as limitative. For example, the stable voltage reference 105 may use other voltage values other than 2.5V. This would be dependent on the desired output voltage $V_o$ since the output voltage is a function of this voltage reference 105 as described earlier.

In this embodiment, the power supply 100 uses the power supply proposed in PCT/SG02/00031 as an example which uses an electric cell to provide an output voltage. However, it should be apparent that other types of power supplies, for example a typical power adapter, may be modified to include the resistive network as described in the preferred embodiment so that such adapters may be used with the connector assembly 200.

The number of pins 1 to 6 in the connector assembly 200 may be varied according to application. For example, instead of six pins, fewer pins may be used if the power supply requires to output only a small range of output voltages $V_o$. In a further example, one more pin can be added as a ground since certain connectors 207 contain an extra connection for grounding purposes to counteract chances of an electrostatic surge.

Having now fully described the invention, it should be apparent to one of ordinary skill in the art that many modifications can be made hereto without departing from the scope as claimed.

The invention claimed is:

1. Apparatus for producing an output voltage to power an electronic device, the apparatus comprising
    a power supply comprising two or more first connection elements in which some or all of the first connection elements are in series with different respective resistive loads and circuitry for maintaining the first connection elements at different voltages; and
    a connector assembly arranged to be coupled between the power supply and the electronic device,
    the connector assembly having at least two second connection elements for connection to respective ones of the first connection elements and electrically connectable to the electronic device, the connector assembly further having selection means for modifying the voltage difference between the first connection elements to which the second connection elements are connected, whereby the connector assembly draws a selected voltage from the power supply and passes the selected voltage to the electronic device.

2. Apparatus according to claim 1, wherein there are more than two first connection elements and the selection means includes one or more auxiliary connection elements which are connectable to selected ones of the first connection elements to vary the voltage difference between the first connection elements to which the second connection elements are attached.

3. Apparatus according to claim 2, wherein the auxiliary elements are electrically connected to each other.

4. Apparatus according to claim 1, wherein sides of the resistive loads away from the first connection elements are mutually connected to a point in a voltage divider circuit.

5. Apparatus according to claim 4 when dependent on claim 3, wherein upon connection of the auxiliary connection elements to selected ones of the first connection elements, the voltage at said point in the voltage divider is held substantially constant and the voltage difference is varied between the first connection elements to which the second connection elements are attached.

6. Apparatus according to claim 1, wherein the second connection elements are electrically connectable to the electronic device via an electric cable.

7. Apparatus according to claim 2, wherein sides of the resistive loads away from the first connection elements are mutually connected to a point in a voltage divider circuit.

8. Apparatus according to claim 3, wherein sides of the resistive loads away from the first connection elements are mutually connected to a point in a voltage divider circuit.

9. Apparatus according to claim 2, wherein the second connection elements are electrically connectable to the electronic device via an electric cable.

10. Apparatus according to claim 3, wherein the second connection elements are electrically connectable to the electronic device via an electric cable.

11. Apparatus according to claim 4, wherein the second connection elements are electrically connectable to the electronic device via an electric cable.

12. Apparatus according to claim 5, wherein the second connection elements are electrically connectable to the electronic device via an electric cable.

13. A power supply comprising two or more first connection elements in which some or all of the first connection elements are in series with different respective resistive loads and circuitry for maintaining the first connection elements at different voltages, the power supply being arranged to be coupled to a connector assembly having at least two second connection elements for connection to respective ones of the first connection elements of the power supply and electrically connectable to an electronic device, the connector assembly further having selection means for modifying the voltage difference between the first connection elements to which the second connection elements are connected, whereby the connector assembly draws a selected voltage from the power supply and passes the selected voltage to the electronic device.

14. A power supply according to claim 13, wherein there are more than two first connection elements and the selection means of the connector assembly includes one or more auxiliary connection elements which are connectable to selected ones of the first connection elements to vary the voltage difference between the first connection elements to which the second connection elements are attached.

15. A power supply according to claim 13, wherein the sides of the resistive loads away from the first connection elements are mutually connected to a point in a voltage divider circuit.

16. A power supply according to claim 15, wherein upon connection of the auxiliary connection elements to selected ones of the first connection elements, the voltage at said point in the voltage divider is held substantially constant and the voltage difference is varied between the first connection elements to which the second connection elements are attached.

17. A power supply according to claim 14, wherein the sides of the resistive loads away from the first connection elements are mutually connected to a point in a voltage divider circuit.

18. A connector assembly arranged to be coupled between a power supply and an electronic device, the power supply comprising two or more first connection elements in which some or all of the first connection elements are in series with different respective resistive loads and circuitry for maintaining the first connection elements at different voltages, the connector assembly comprising at least two second connection elements for connection to respective ones of the first connection elements of the power supply and electrically connectable to the electronic device, and selection means for modifying the voltage difference between the first connection elements of the power supply to which the second connection elements are connected, whereby the connector assembly draws a selected voltage from the power supply and passes the selected voltage to the electronic device.

19. A connector assembly according to claim 18, wherein the power supply comprises more than two first connection elements and the selection means includes one or more auxiliary connection elements which are connectable to selected ones of the first connection elements of the power supply to vary the voltage difference between the first connection elements of the power supply to which the second connection elements are attached.

20. A connector assembly according to claim 19, wherein the auxiliary elements are electrically connected to each other.

21. A connector assembly according to claim 20, wherein upon connection of the auxiliary connection elements to selected ones of the first connection elements, the voltage difference is varied between the first connection elements of the power supply to which the second connection elements are attached.

22. A connector assembly according to claim 18, wherein the second connection elements are electrically connectable to the electronic device via an electric cable.

23. Apparatus according to claim 7, wherein the second connection elements are electrically connectable to the electronic device via an electric cable.

24. Apparatus according to claim 8, wherein the second connection elements are electrically connectable to the electronic device via an electric cable.

25. A connector assembly according to claim 19, wherein the second connection elements are electrically connectable to the electronic device via an electric cable.

26. A connector assembly according to claim 20, wherein the second connection elements are electrically connectable to the electronic device via an electric cable.

27. A connector assembly according to claim 14, wherein the second connection elements are electrically connectable to the electronic device via an electric cable.

* * * * *